United States Patent
Caulfield et al.

(10) Patent No.: US 10,552,160 B2
(45) Date of Patent: Feb. 4, 2020

(54) HANDLING STALLING EVENT FOR MULTIPLE THREAD PIPELINE, AND TRIGGERING ACTION BASED ON INFORMATION ACCESS DELAY

(71) Applicant: ARM Limited, Cambridge (GB)

(72) Inventors: Ian Michael Caulfield, Cambridge (GB); Max John Batley, Cambridge (GB); Chiloda Ashan Senarath Pathirane, Cambridge (GB)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 15/987,113

(22) Filed: May 23, 2018

(65) Prior Publication Data
US 2018/0267805 A1    Sep. 20, 2018

Related U.S. Application Data (62) Division of application No. 14/944,803, filed on Nov. 18, 2015, now abandoned.

(51) Int. Cl.
*G06F 9/38* (2018.01)

(52) U.S. Cl.
CPC .................. *G06F 9/3851* (2013.01)

(58) Field of Classification Search
CPC .................. G06F 9/3851; G06F 9/524
See application file for complete search history.

(56) References Cited

U.S. PATENT DOCUMENTS

| | | | |
|---|---|---|---|
| 6,018,759 A * | 1/2000 | Doing | G06F 9/3009 712/E9.032 |
| 6,470,443 B1 | 10/2002 | Emer | |
| 6,694,425 B1 | 2/2004 | Eickemeyer | |
| 7,093,109 B1 * | 8/2006 | Davis | G06F 9/3802 712/228 |
| 7,269,712 B2 | 9/2007 | Cho | |
| 7,360,064 B1 | 4/2008 | Steiss | |
| 7,596,683 B2 | 9/2009 | Morrow | |
| 2003/0005251 A1* | 1/2003 | Wilson | G06F 9/4881 711/167 |

(Continued)

OTHER PUBLICATIONS

U.S. Appl. No. 14/944,803, filed Nov. 18, 2015, Inventor: Caulfield et al.

(Continued)

*Primary Examiner* — Michael J Metzger
(74) *Attorney, Agent, or Firm* — Nixon & Vanderhye P.C.

(57) ABSTRACT

A processing pipeline for processing instructions with instructions from multiple threads in flight concurrently may have control circuitry to detect a stalling event associated with a given thread. In response, at least one instruction of the given thread may be flushed from the pipeline, and the control circuitry may trigger fetch circuitry to reduce a fraction of the fetched instructions which are fetched from the given thread. A mechanism is also described to determine when to trigger a predetermined action when a delay in accessing information becomes greater than a delay threshold, and to update the delay threshold based on a difference between a return delay when the information is returned from the storage circuitry and the delay threshold.

13 Claims, 5 Drawing Sheets

(56) References Cited

U.S. PATENT DOCUMENTS

| | | | |
|---|---|---|---|
| 2004/0078790 A1* | 4/2004 | Wu | G06F 8/4442 |
| | | | 717/154 |
| 2005/0210471 A1 | 9/2005 | Okawara | |
| 2006/0179284 A1 | 8/2006 | Jensen | |
| 2006/0259791 A1* | 11/2006 | Dockser | G06F 1/3228 |
| | | | 713/300 |
| 2008/0250271 A1 | 10/2008 | Ozer | |
| 2008/0263325 A1 | 10/2008 | Kudva | |
| 2009/0210660 A1 | 8/2009 | Webber | |
| 2013/0290675 A1 | 10/2013 | Chou | |
| 2013/0297910 A1 | 11/2013 | Smolens | |
| 2014/0006817 A1 | 1/2014 | Bonen | |
| 2014/0237212 A1* | 8/2014 | Garg | G06F 12/0215 |
| | | | 711/205 |

OTHER PUBLICATIONS

Office Action dated Jan. 24, 2018 in co-pending U.S. Appl. No. 14/944,803, 18 pages.

Sun et al, "An instruction fetch policy handling L2 cache misses in SMT processors" $8^{th}$ International Conference on High-Performance Computing in Asia-Pacific Region, Dec. 2005, 7 pages.

Tullsen et al, "Handling long-latency loads in a simultaneous multithreading processor" $34^{th}$ annual ACM/IEEE International Symposium on Microarchitecture, Dec. 2001, pp. 318-327.

\* cited by examiner

HANDLING STALLING EVENT FOR MULTIPLE THREAD PIPELINE, AND TRIGGERING ACTION BASED ON INFORMATION ACCESS DELAY

This application is a divisional of U.S. patent application Ser. No. 14/944,803 filed Nov. 18, 2015, the entire content of which is hereby incorporated by reference in this application.

BACKGROUND

Technical Field

The present technique relates to the field of data processing.

Technical Background

While processing a thread of instructions, a processing pipeline may encounter a stalling event, such as when an instruction requires data from a data store and there is a delay in accessing the information. In some systems, such stalling events may be very frequent and can affect performance.

SUMMARY

At least some examples provide an apparatus comprising: a processing pipeline to process instructions with instructions from a plurality of threads in flight in the processing pipeline concurrently, comprising fetch circuitry to fetch instructions from the plurality of threads for processing by the processing pipeline; and
control circuitry to detect a stalling event associated with a given thread of said plurality of threads, and in response to detecting the stalling event, to flush from said processing pipeline at least one pending instruction of said given thread, and to trigger said fetch circuitry to reduce a fraction of fetched instructions which are fetched from said given thread.

At least some examples provide a data processing method comprising:
fetching instructions from a plurality of threads for processing by a processing pipeline, wherein instructions from the plurality of threads are in flight in the processing pipeline concurrently;
detecting a stalling event associated with a given thread of said plurality of threads; and
in response to detecting the stalling event, flushing from said processing pipeline at least one pending instruction of said given thread, and reducing a fraction of fetched instructions which are fetched from said given thread.

At least some examples provide an apparatus comprising:
control circuitry to trigger a predetermined action when a delay in accessing information from storage circuitry becomes greater than a delay threshold; and
threshold updating circuitry to determine a return delay when the information is returned from the storage circuitry and to adjust the delay threshold in dependence on a difference between the return delay and the delay threshold.

At least some examples provide a data processing method comprising:
triggering a predetermined action when a delay in accessing information from storage circuitry becomes greater than a delay threshold;
determining a return delay when the information is returned from the storage circuitry; and
adjusting the delay threshold in dependence on a difference between the return delay and the delay threshold.

Further aspects, features and advantages of the present technique will be apparent from the following description of examples, which is to be read in conjunction with the accompanying drawings.

DESCRIPTION OF EXAMPLES

Some specific example embodiments are described below. It will be appreciated that the invention is not limited to these precise embodiments.

A processing pipeline may have fetch circuitry for fetching instructions from a plurality of threads for processing by the pipeline. The processing pipeline may allow instructions from multiple threads to be in flight in the pipeline concurrently. While processing instructions, a stalling event may occur for a given thread of the plurality of threads. For example, the stalling event could be a delay while waiting for information to be fetched from a data store, a delay while waiting for a required hardware unit to be powered up, or some other event which means that instructions from the given thread cannot make progress. When the stalling event is detected then the instructions from the stalled thread may occupy several slots within tracking structures within the pipeline, and this may block instructions from other threads from proceeding. Hence, a stalling event on one thread may reduce the performance of the system. This may be particularly significant in some systems (e.g. in networking), where stalling events such as delays in accessing data caused by cache misses may be very frequent, and can dominate performance.

Control circuitry may therefore be provided to detect a stalling event associated with a given thread and in response to detecting the stalling event, to flush from the pipeline at least one pending instruction of the given thread, and to trigger the fetch circuitry to reduce a fraction of fetched instructions which are fetched from that given thread. By flushing at least one instruction of the given thread which stalled and reducing the fraction of fetch instructions which come from that thread, more of the pipelines resources can be allocated to instructions from other threads which can typically make good use of this additional resource to progress quicker, thus increasing the overall performance with which the multiple threads can be processed.

In response to detecting the stalling event, the control circuitry may retain at least one instruction of the given thread which stalled in the pipeline. This can be useful in some implementations for ensuring forward progress of the stalled thread. In contrast, if all of the instructions of the stalled thread were flushed then it is possible that this may prevent the stalling event being resolved so that when that thread is later fetched again then the stalling event could happen again. Hence, overall performance may be improved by retaining at least one instruction of the stalled thread while flushing other instructions of that thread and reducing the fraction of fetched instructions coming from that thread.

However, in other examples, the control circuitry may flush all the instructions of the given thread from the pipeline.

In some cases when the stalling event occurs then the fetch circuitry may stop fetching instructions from the given thread altogether in order to reduce the fraction of fetched instructions which come from that thread to zero. In other examples, the fetch circuitry may reduce the fraction of fetched instructions for the given thread to a non-zero fraction so that some instructions may still be fetched from that thread, but fewer than before the stalling event was detected.

The reduced fetching of instructions from the given thread may last for some time after the stalling event. After a period, the control circuitry may then resume fetching instructions at the original rate. Hence, after a lapse of a period of time following detection of the stalling event, the control circuitry may control the fetched circuitry to increase the fraction of the fetched instructions which are fetched from the given thread. This period of time could be a statically defined period or could be dynamically predicted based on previous observations of the length of time taken for a stalling event to be resolved.

Alternatively, rather than waiting for a given period of time, the control circuitry may wait for receipt of an indication of resolution of the stalling event. The control circuitry may trigger the fetch circuitry to increase the fraction of fetched instructions which are fetched from the given thread. The resolution indication could in some cases indicate that the stalling event has already been resolved, while in other cases it could be an advance warning that the stalling event will soon be resolved but may not yet have been resolved. For example, where the stalling event corresponds to a miss in at least one cache then the resolution indication could be generated by the cache or memory system once data is being returned to the cache and will soon be made available to the processing pipeline.

There may be different ways of implementing a processing pipeline which permits instructions from multiple threads to be in flight concurrently. One example is a processing pipeline which supports simultaneous multi-threading (SMT). For an SMT system, the processing pipeline may include at least one pipeline stage configured to hold in flight instructions from multiple threads concurrently. Unlike conventional pipelines which may support multiple threads on a coarse grained basis so that one particular thread is processed at a given time and periodic interrupts may trigger context switching between threads, with register state associated with the old thread being saved to memory so that the same registers may be used for storing data for the new thread, with an SMT system multithreading is supported at a more fine grained level so that instructions from multiple threads can be resident within a given pipeline stage at once. Each instruction may be tagged with an identifier identifying which of the threads that instruction belongs to. Multiple sets of registers may be provided for handling the architectural state associated with each thread, so that it is not necessary to perform state saving or state restoration operations when switching between threads.

Hence, there may be at least one shared tracking structure which may track pending instructions from multiple threads, for example a decode queue for queuing pending instructions to be decoded, an issue queue for queuing pending instructions to be issued for execution, a load/store queue for queuing pending load instructions for loading data from a data store or store instructions for storing data to the data store, and a reorder buffer used in an out of order processing pipeline to store information for tracking completion of execution of instructions by the pipeline. Any of these tracking structures may include instructions from multiple threads which may be distinguished by a thread identifier. In a system with shared tracking structures, the present technique can be particularly useful because by flushing instructions from the stalled thread this may make more space available in the tracking structures for instructions from other threads to allow the other threads to proceed more quickly until the stall has been resolved.

Alternatively, each pipeline stage of the processing pipeline may be configured to hold in flight instructions from a single thread, but one pipeline stage may hold in flight instructions from a different thread to another pipeline stage. This approach may be referred to as fine-grained multi-threading (as opposed to the coarse-grained multi-threading discussed above where the entire pipeline holds instructions from only one thread). With fine-grained multi-threading, rather than each instruction being tagged with a thread identifier, each pipeline stage may have a shared thread identifier which identifies the thread from which each of the instructions in that pipeline stage was fetched.

As discussed above, in some cases the stalling event may comprise a delay in accessing information from storage circuitry in response to a pending instruction of the given thread. The storage circuitry may be a cache or memory, and the information to be accessed may be data stored in the cache or the memory which is required for processing a given instruction. In other examples, the required information may be address translation information for translating virtual addresses into physical addresses, which may be stored in a translation lookaside buffer (TLB) or in page tables in memory. Hence, unless otherwise specified, the references to accessing information below should be interpreted not only to include accessing data from a cache or memory, but also includes accessing address translation data from a TLB or memory.

When accessing information from storage circuitry, there may be a range of delays associated with different requests for information. For example, if a request hits in a level one data cache or a level one TLB then the request may be handled relatively quickly while if the required information is not in the level one cache or TLB then it may take longer. The absolute delay for a given request may depend on a number of factors such as the system topology being used (e.g., how many levels of cache or TLB are provided), the level of contention for those storage devices at a given time, and the traffic on any buses or bridges used to transfer data between the different devices.

As flushing the pipeline and reducing the fraction of instructions fetched from a given thread is a relatively significant event which may reduce performance of that thread if the stalling event would not have taken long to resolve, in some cases the control circuitry may detect the stalling event when the delay in accessing the information from the data store becomes greater than a threshold delay. Hence, requests for information which can be serviced relatively quickly may not trigger a flush but once the delay becomes particularly long then flushing the pipeline and fetching a greater fraction of instructions from other threads can allow overall performance to be improved by increasing the throughput of those other threads.

Providing a threshold delay for controlling when the pipeline is flushed can be useful because, while the flush helps to improve performance when the stalling event causes a long delay for the stalled thread, it would be undesirable to actually wait until the long delay has happened before flushing, otherwise the opportunity to benefit from flushing has already been lost. A threshold delay can be set which is shorter than the "long delay" of interest, on the assumption that once a request has been waiting longer than the threshold, it will likely wait much longer. This can be particularly useful in cases where the stalling event is caused by a cache or TLB miss, for example, where once the delay becomes longer than a given threshold, this is indicative of a last level cache or TLB miss, which indicates that the delay will likely to be much longer than the threshold while information is fetched from memory.

In some cases the threshold delay used to determine whether a delay in handling a given information request is considered a stalling event could be a fixed delay set statically for a given system. For example, if the system topology is known then it may be known that misses in a certain level of cache or TLB will tend to cause a delay greater than a certain level and so a suitable threshold could be selected.

However, as mentioned above the delay may depend not only on the level of the cache or TLB hierarchy at which a request hits, but also on other factors such as contention from other requests, so the most appropriate threshold may not always be the same. Therefore, a dynamically adjusted threshold delay could be used to determine whether the delay in accessing data or address translation information should trigger a flush of the pipeline for the thread which requested the information. For example, adjusting the threshold delay based on a comparison between the eventual delay when the information is actually returned and the threshold delay can be useful for ensuring that the stalling event is not detected prematurely even if systems have different topologies or there are different levels of contention for the data store. This will be discussed in more detail below.

Alternatively, rather than detecting the stalling based on the delay in accessing information, the stalling event could be detected when a request for information misses in a predetermined storage level of the storage circuitry (e.g. a level 2 cache or a level 2 TLB). When a miss at a given level of the cache or TLB hierarchy occurs, it may be assumed that the delay in fetching the required information from a further level cache or TLB or from main memory may take significantly longer and so the flush response may be justified.

Another example of a stalling event may be when a pending instruction for the given thread required a hardware unit which is currently in a power saving state. In this case it may take some time to warm up the hardware unit before the pending instruction can be processed, and so during this period the pipeline can be flushed of pending instructions and other threads may use the increased allocation of resource made available by reducing the fraction of fetched instructions which come from the given thread.

As mentioned above, when the stalling event is detected, at least one pending instruction of the given thread may be retained in the pipeline to ensure that thread can still make some forward progress. In some implementations, retaining at least one pending instruction of the given thread (e.g. the instruction that stalled) can be useful for avoiding livelock conditions. For example, where the stalling event is caused by a delay in accessing information in a cache or TLB, if the instruction which requires the information is flushed and then restarted once the information has been loaded into the cache or TLB, it is possible that by the time the instruction reaches the pipeline stage at which the cache or TLB is accessed, another instruction may already have caused the information to be evicted from the cache or TLB, leading to the stalling event happening again, and if this keeps being repeated then the stalling event might never be resolved. By retaining at least some instructions of the stalled thread the likelihood of this can be reduced.

On the other hand, in other implementations the nature of the stalling event may be such that livelock is less likely, or the pipeline may have other mechanisms for avoiding livelock (e.g. the cache or TLB may have the ability to lock down certain entries to avoid them being evicted until the stalled instruction has used the information, or a buffer separate from the cache or TLB may be provided to hold the required information until the stalled instruction uses the information), in which it may not be essential to retain an instruction of the stalled thread in the pipeline.

In any case, even if retaining at least one instruction of the stalled thread in the pipeline is not essential for avoiding livelocks or deadlocks, retaining at least one instruction of the stalled thread may still be useful for improving performance by reducing the startup penalty when fetching of the stalled thread resumes later after resolution of the stalling event.

There are a number of ways in which the pipeline could select which particular instruction(s) of the stalled thread are retained.

In some examples, the retained instruction may comprise the oldest pending instruction of the given thread. In this context, the oldest pending instruction may be the instruction which appears earliest in the program order in which the instructions are fetched from an instruction cache or memory (irrespective of whether an out-of-order processor might execute the instructions in a different order). While the oldest pending instruction might not necessarily be the instruction which triggered the stalling event, often this may be the case. It may be simpler to assume that the oldest pending instruction would usually be the instruction which triggered the stalling event, rather than attempting to detect which particular instruction stalled. In practice, if the stalling event is detected when a delay in handling the instruction exceeds a given threshold, then by the time the threshold is exceeded, that instruction may anyway have become the oldest pending instruction. Also, sometimes the instruction which stalled may depend on the oldest pending instruction and so retaining the oldest instruction can allow processing to resume more quickly following resolution of the stall.

In some cases the processing pipeline may support in-order execution of instructions so that instructions are executed in the same order as their program order.

On the other hand, the processing pipeline could support out-of-order execution and in this case may have an issue queue which tracks pending instructions to be issued for execution and a reorder buffer to track completion of execution of pending instructions by the processing pipeline. For example, an instruction may be issued for execution once its operands are ready, but it may not be known until an earlier instruction in the program order has completed whether that later instruction actually needed to be executed, and so in the meantime it may be executed speculatively and the reorder buffer may track that it has been executed and mark that instruction as completed once any earlier instructions on which it depends have also completed. In this case, when a stalling event occurs the control circuitry may detect an oldest uncompleted instruction of the given thread from among the pending instructions that are tracked by the issue queue and the reorder buffer, and flush that oldest uncompleted instruction and any younger instructions of the same thread. This approach can be useful because it means that work already completed is not wasted but enough sufficient instructions are flushed from the pipeline to allow other threads to make better progress.

On the other hand, in other examples when a stalling event occurs then the at least one pending instruction retained in the pipeline may include the stalled instruction. By identifying which instruction stalled (e.g. the instruction which is waiting for information to be returned from a data store or which is waiting for a hardware unit to be powered up), that instruction may make forward progress and so once the stall has been resolved then it can be executed and the stalled thread may resume its normal fetch pattern.

In some cases, in addition to the stalled instruction, at least one subsequent instruction may also be retained in the pipeline. By retaining N subsequent instructions after the stalled instruction, this can reduce the effective start-up penalty for the affected thread once the stall has been resolved, since there is no need to wait for the N subsequent instructions to be fetched, decoded and provided to the point of the pipeline at which they would be processed. The number of subsequent instructions N which are retained could be set statically for a pipeline so that it is always the same, could be selected under software control (e.g. an operating system may specify how many instructions should be retained) or could be dynamically determined using hardware prediction mechanisms, such as using a performance counter and a converging optimization algorithm in hardware.

In some cases the retained instructions may also include at least one subsequent instruction of the given thread whose outcome is independent of an outcome of the stalled instruction. Since such an instruction would not be waiting for the stall to be resolved, then it may still be executed and so by not flushing this instruction this avoids the delay to this instruction which would occur if it was flushed and had to be fetched again later.

Another way of identifying which instructions to retain may be to identify the next stallable instruction of the given thread for which the stalling event was detected. The next stallable instruction may be the next instruction of the given thread following the stalled instruction that is of an instruction type for which the stalling event can occur. For example, if the stalling event is a miss in a TLB or a cache following a load instruction, then the next stallable instruction may be the next load in that thread. Hence, the flush may start at the next stallable instruction (any subsequent instruction of the given thread may also be flushed). Hence, once the stalled instruction has its stalling event resolved then a number of remaining instructions in the pipeline following that instruction will not trigger the same kind of stalling event and so can likely be processed relatively quickly, while if a subsequent stallable type instruction is in the same thread then this is flushed along with subsequent instructions.

Figure 1:
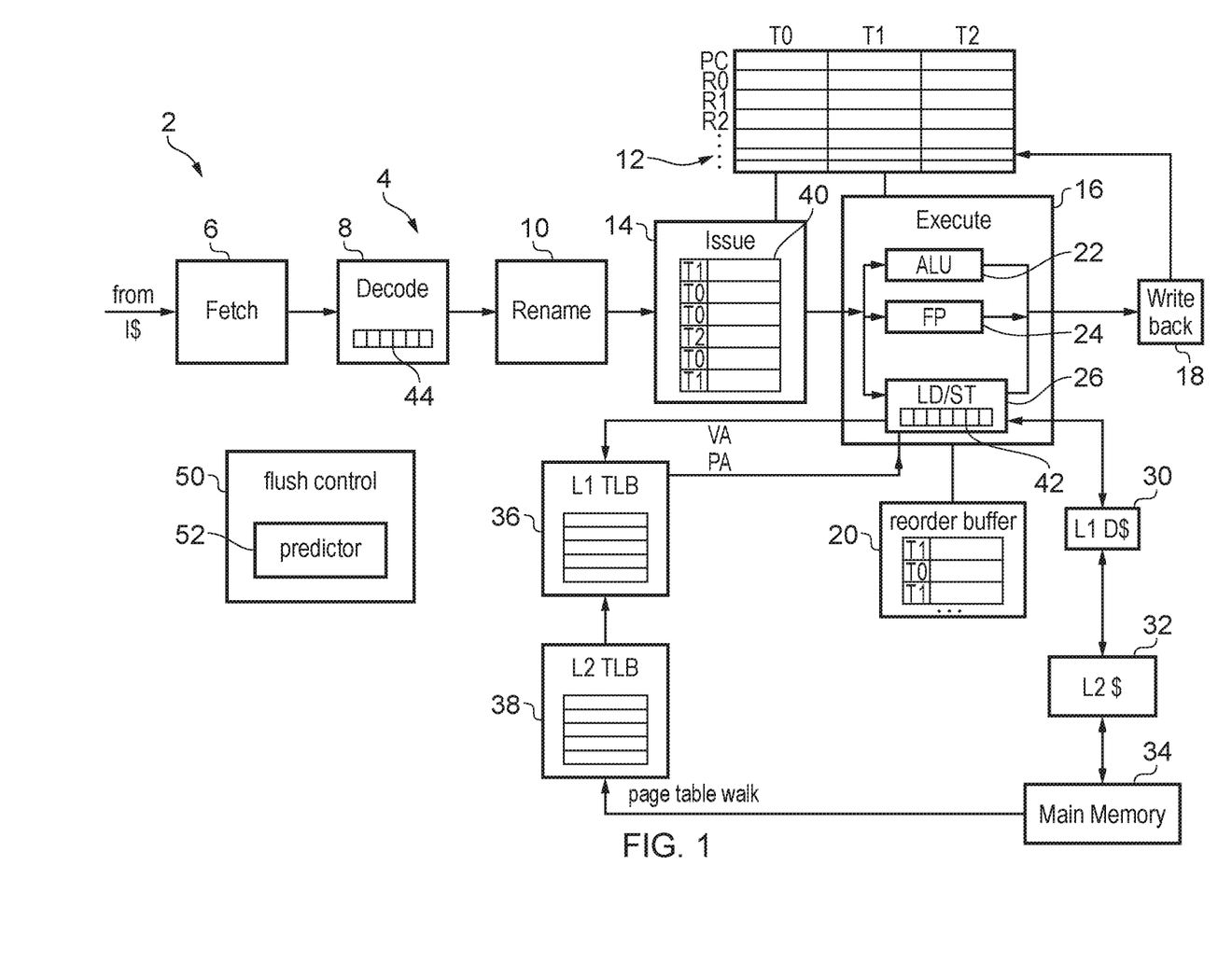
FIG. 1 schematically illustrates an example of a processing pipeline for processing instructions from multiple threads.

FIG. 1 schematically illustrates an example of a data processing apparatus 2 having a processing pipeline 4 for processing instructions from multiple threads. The pipeline includes a number of pipeline stages including a fetch stage 6 for fetching instructions from an instruction cache or memory; a decode stage 8 for decoding the fetched instructions; a register rename stage 10 for performing register renaming to map architectural register specifiers specified by instructions to physical register specifiers identifying physical registers 12 provided in hardware for storing data to be processed in response to the instruction; an issue stage 14 for issuing instructions for execution; an execute stage 16 for executing instructions; and a write back stage 18 for writing back the results of the executed instructions to the registers 12. In some cases the write back stage 18 could be considered part of the execute stage 16. It will be appreciated that this is just an example of the stages which could be provided in the pipeline and other examples may have different arrangements of pipeline stages.

In this example, the pipeline supports out-of-order execution of instructions so that the issue stage 14 may issue instructions for execution by the execute stage 16 in a different order to the order in which the instructions were fetched from the instructions cache by the fetch stage 6. This can be useful for improving performance since when one instruction is waiting for an earlier instruction to complete so that it can use the result of that instruction, a later instruction in the program order which is independent of the earlier instruction can continue. The renaming stage 10 may allocate physical register specifiers from a pool of physical registers 12 which is larger than the number of architectural register available in the architecture, to eliminate hazards between instructions specifying the same architectural register specifier and hence improve the extent to which instructions can be reordered to improve performance. A reorder buffer 20 is provided to track completion of execution of instructions, which occurs when the instruction has both been executed by the execute stage 16 and the instruction has been committed. An instruction is committed once any earlier instructions whose outcomes are required to be known before the later instruction is known to be correct have also completed. Hence, the issue stage 40 may issue some instructions for execution speculatively before the earlier instructions have completed and so the reorder buffer 20 may track whether instructions have already been executed or committed, and instructions may be retired from the reorder buffer 20 once they have been both executed and committed.

The execute stage 16 may have a number of execute units for executing different kinds of instructions. For example, in FIG. 1 the execute stage 16 includes an arithmetic logic unit (ALU) 22 for executing arithmetic instructions such as adds, subtracts, multiply or divide or square root, and logical instructions such as bitwise AND, OR, NOR, or XOR operations or shift operations. The execute stage 16 may also have a floating point unit 24 for executing instructions using floating-point operands and a load/store unit 26 for executing load instructions to load data from a cache or memory into registers 12 or store instructions for storing data from the registers 12 to the cache or memory. As shown in FIG. 1, the memory system may include a number of levels of cache including a level 1 data cache 30, and a level 2 data cache 32. The level 2 data cache 32 may for example cache a subset of information from main memory 34 which can be accessed more quickly than if it had to be fetched from main memory. Similarly, the level 1 data cache 30 may cache a smaller subset of the data from the memory 34 for even quicker access. This is just one example of a possible cache hierarchy and other examples may have more or fewer levels of cache.

Load and store instructions may identify the storage location of the data to be fetched from the memory system using a virtual address, but the memory system may use a physical address which may be different. Hence, page table entries may be used to translate virtual addresses into physical addresses. A page table in main memory 34 may include a number of entries defining virtual to physical address translations for different pages of the address space. However, it can be slow to access these translation entries from the memory and so to speed up address translation a translation lookaside buffer (TLB) may be provided to cache a subset of page table entries for recently used address translations. In some cases multiple levels of TLB may be provided. For example in FIG. 1 the system includes a level 1 (L1) TLB 36 and a level 2 (L2) TLB 38. In response to an instruction specifying a virtual address, the load store unit 26 sends a request to the level 1 TLB 36 and the level 1 TLB 36 looks up its cache to determine whether it contains a page table entry for the required virtual address, and if so a physical address is returned. In some cases the page table entries may also include access permission data specifying whether instructions from a given thread or process may access each page and this may be used to determine whether the physical address is returned or an access violation is signalled. If the L1 TLB 36 does not include the required address translation data, then it requests it from the L2 TLB 38 which has a larger cache of page table entries. If the L2 TLB 38 does not contain the required data then a page table walk may be triggered to traverse page table structures in main memory 34 to identify the required entry.

The pipeline 4 supports simultaneous multithreading (SMT) so that tracking structures, such as an issue queue 40 for queuing instructions to be issued in the issue stage 14, a load/store queue 42 for queuing load or store instructions being processed, the reorder buffer 20, or a decode queue 44 for queuing instructions to be decoded may include instructions from several threads at a time. As shown for the issue queue 40 and the reorder buffer 20, instructions may be tagged with a thread identifier T0, T1 and T2 etc. to identify which threads the instructions belong to. It will be appreciated that a similar approach may be used for the decode queue 44 and the load/store queue 42. The physical registers 12 may include a number of register banks corresponding to the respective threads so that each thread's architectural state may be retained by the pipeline simultaneously, and it is not necessary to switch between threads using interrupts, context switches and state saving/restoration. Hence, the pipeline can simply execute a mixture of instructions from the respective threads, with the appropriate state in the registers 12 being updated depending on the thread identifiers of the instruction being processed.

Other example embodiments may use fine-grained multithreading where each pipeline stage holds instructions in flight from a single thread, but different pipeline stages may concurrently hold instructions from different threads.

While processing instructions an instruction of a given thread may encounter a delay. For example, an instruction may require an external hardware unit that is currently powered down (e.g. a peripheral device or a co-processor) and so processing of that instruction may have to wait for the hardware device to be powered up. Also, delays can be caused by a request for data missing in the cache 30, 32 or an address translation request missing in the TLB 36, 38. For the subsequent description, for ease of explanation it shall be assumed that a stall for a given thread is caused by information missing in a cache or TLB, but it will be appreciated that the technique can be applied more generally to other forms of stalling event such as the hardware unit being powered down.

When a stalling event occurs then this may greatly affect performance of the pipeline. For example, in some systems such as networking cache misses may be very frequent and can dominate performance. At the point a given thread is stalled, many of the tracking structures within the pipeline may have a number of transaction slots allocated to instructions from that thread. For example, the decode queue 44, the issue queue 40 and the reorder buffer 20 and load store queue 42 may have slots occupied with instructions from the stalled thread and so there may be relatively few slots available for other threads to continue being processed. This can therefore greatly affect the performance of the pipeline as a whole.

To address this, flush control circuitry 50 may be provided for detecting stalling events such as cache or TLB misses and controlling the pipeline 4 to improve performance when these events are detected. The flush control circuitry 50 may have prediction circuitry 52 for predicting when such stalling events have occurred. The prediction circuitry 52 will be described in more detail below.

Figure 2:
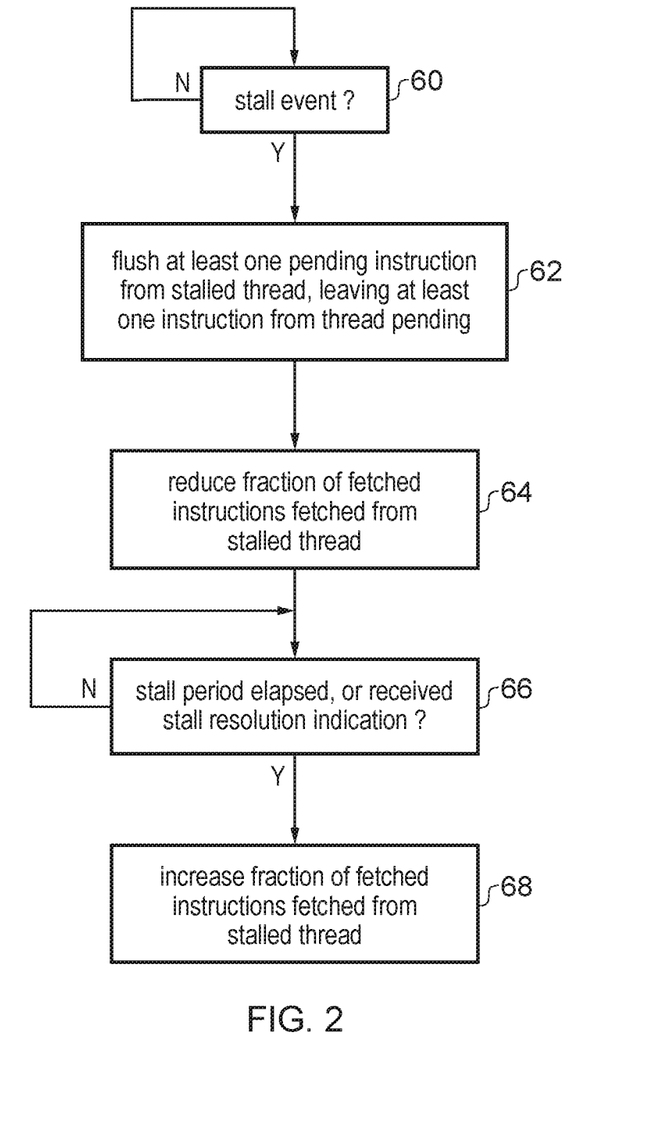
FIG. 2 shows an example of responding to a stall event associated with a given thread being processed.

FIG. 2 shows a method for the flush control circuitry 50 to respond to detected stalling events. At step 60 the prediction circuitry 52 detects the stalling event for a given thread. For example, this may occur when a delay in processing the instruction from that thread becomes greater than a certain delay threshold. Setting of the delay threshold will be described in more detail below.

When the stall event is detected then at step 62 the flush control circuitry 50 controls the pipeline 4 to flush at least one instruction from the stalled thread. Hence, any transaction slots within tracking structures such as the decode queue 44, issue queue 40, load store queue 42 and reorder buffer 20 corresponding to flushed instructions from the stalled thread can be invalidated, and this provides more resource available for handing instructions from other threads. Optionally, at step 62 the flush control circuitry 50 may leave at least one instruction from the stalled thread pending in the pipeline. This can be useful for avoiding deadlock or livelock situations or for reducing the startup penalty when the fetch stage resumes the original fetch rate for the stalled thread at a later time.

At step 64, the flush control circuitry 50 also controls the fetch stage 6 to reduce the fraction of fetched instructions which are fetched from the stalled thread. For example if thread T0 includes the stalled instruction, then the fetch stage 6 may start fetching fewer instructions from thread T0 and a greater proportion of the fetched instructions may relate to other threads T1, T2 etc. Hence, more of the pipeline's resources start to be allocated to other threads which can make use of this resource to progress quicker, so that overall performance can be improved following the stall.

At step 66 the flush control circuitry 50 determines whether a predetermined stall period has elapsed, or whether a stall resolution indication has been received indicating that the stall has been (or will soon be) resolved. For example the stall resolution indication could be an indication from the cache hierarchy that the information has been received from memory 34 and will soon be available to the load/store unit 26. Alternatively, the flush control circuitry could simply wait for a given period of time to elapse. Once the stall period has elapsed or the store resolution indication has been received, then at step 68 the flush control circuitry 50 increases the fraction of fetched instructions fetched from the stall thread. In some cases, the increased fraction corresponding to the stalled thread could be the same as the fraction of instructions which were being fetched from that thread before the stall event was detected. In other cases, the fetched fraction for the stall thread may be increased to a level above the fraction being fetched before the stall event was detected, to compensate for the period when the stalled thread had fewer instructions being fetched, to allow the stalled thread to catch up in terms of performance.

At step 62 at least one instruction of the stalled thread may remain in the pipeline to ensure forward progress. There are a number of ways of selecting which instructions of the stalled thread are flushed and which remain. In general, the instruction which triggers the stall (e.g. a load requiring data from the cache, or a load/store instruction requiring an address translation), may be retained but subsequent instructions may be flushed. In some cases N instructions after the stalled instruction can also be preserved to reduce the start-up penalty when the affected thread is resumed later. N could be selected statically, under software control or determined dynamically by a hardware predictor. In some cases rather than actually detecting which instruction will trigger the stall, the oldest instruction associated with a given thread in either the issue queue 40 or the reorder buffer 20 could be flushed and any younger instructions could also be flushed. This may provide a simple way of identifying instructions which have not yet been attempted to be executed and make space available for other threads to be handled. Another approach could be to keep the stalled instruction of the given thread and any subsequent instructions which are independent of that instruction or which cannot trigger another stall event, and flush from the next following instruction which could trigger a stall event.

There are a number of ways of detecting when the stall event has occurred. For information accesses in the cache or the TLB, one approach may be to detect the stall event when a given request misses in a certain level of cache or TLB, e.g. a level 2 or level 3 cache or a level 2 TLB. However, different system topologies may have different delays associated with accessing particular levels of cache or TLB and so in some cases even when a certain level of cache misses, the delay may still not be particularly large, and it may not be worth flushing the pipeline in this case. Also, at different times there may be different levels of contention for a given level of cache or TLB depending on the number of requests for data or address translations at a given time. Some systems may have asynchronous bridges for communicating between different levels of the storage circuitry and the performance may depend on the level of traffic on the bridge.

Figure 3:
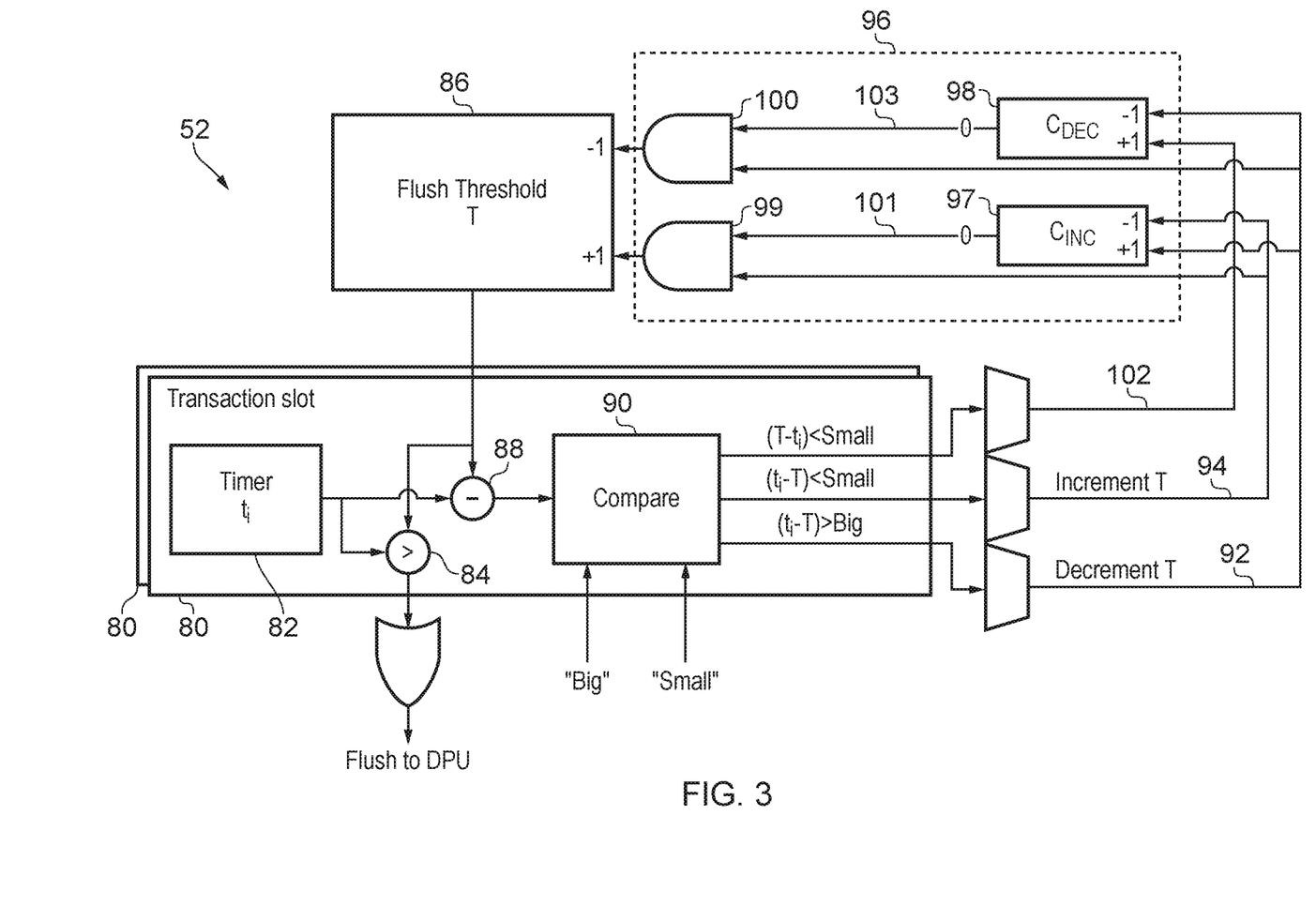
FIG. 3 shows an example of a stall predictor for predicting when a delay in accessing information from data store is sufficiently large to trigger a store response.

Therefore, to be able to detect when it is worthwhile to indicate that the flush conditions have been reached, while coping with different system topologies or operating conditions, a predictor 52 may be provided as shown in FIG. 3 to detect when the flushing mechanism should kick in. It adaptively predicts when a miss in the cache 30, 32 or TLB 36, 38 has caused a delay long enough to make it worthwhile to flush instructions from that thread and increase the level of fetching of other threads.

As shown in FIG. 3, the predictor 52 may have a number of transaction slots 80 for tracking the delay in handling instructions or transactions for which the stalling event could occur. For example, each transaction slot 80 could relate to a load or store instruction in the load/store queue 42. For each transaction slot, the predictor 52 includes a timer 82 for tracking the amount of time by which the corresponding instruction or transaction has been delayed so far. In some cases, the timer 82 could start counting the delay when the corresponding instruction is executed, or when a request for data or an address translation entry is issued to the L1 cache 30 or L1 TLB 36. However, to save energy the timer 82 may only be triggered when a request for information misses in a given level of the cache or TLB (e.g. the level 1 cache 30 or level 1 TLB 36). By disabling counting until a transaction has missed in the level 1 cache or TLB, this avoids toggling the timer for most transactions which hit in the top level cache or TLB, saving energy.

Regardless of the point at which the timer starts, a comparator 84 is provided to compare the timer against a flush threshold T held in a flush threshold register 86. When the timer 82 exceeds the flush threshold T then the comparator 84 generates a stall event signal and this triggers the flushing of the pipeline for instructions from the affected thread and increased fetching of instructions from the other threads. Hence, if a data access request or an address translation request is serviced relatively quickly then it does not trigger a flush, but once the delay becomes greater than the threshold then a flush is triggered.

The flush threshold T is dynamically adjusted based on a comparison of the threshold T with the actual return delay taken for the requested information to be returned from the cache or the TLB. A subtractor 88 subtracts the flush threshold T from the timer value $t_i$ and compares the difference with two limit values which will be referred to as the "big" limit and the "small" limit. The difference output by the subtractor 88 represents the amount by which the delay in accessing the information exceeded the threshold at the point when the information was actually returned. The big and small limits may be preset values selected depending on the particular system design. The big limit is generally greater than the small limit.

Hence, when the transaction ultimately completes (the required information has been returned), the difference between the timer and the threshold is compared by comparator 90 against the big and small limits. If the difference $t_i-T$ is larger than the preset big limit, then a decrement signal 92 is asserted to trigger decrementing of the flush threshold T. When $t_i-T$ exceeds the big limit then this indicates that the transaction remained stalled for a long time after the flush event was triggered, and therefore the flush was useful since other threads were able to proceed during this long delay. Therefore, by decrementing the flush threshold T in this case, this means that the flush will be initiated even sooner next time to gain further performance improvements.

On the other hand, if the difference $t_i-T$ is less than the small limit, comparator 90 asserts an increment signal 94 which triggers incrementing of the flush threshold T. $t_i-T$ being less than the small limit indicates that the transaction completed soon after the flush was triggered, and so the cost of flushing was not justified. In this case, by incrementing the flush threshold T, the predictor will wait longer before flushing next time.

In this way, the system may set a flush threshold T which provides a balance between flushing soon enough that the longest delays are detected early enough that the other threads can make better progress in the meantime, and not flushing excessively early so that the overhead of the flush is not incurred unless it is likely that the transaction will continue to be delayed for a long time after the threshold.

Figure 4:
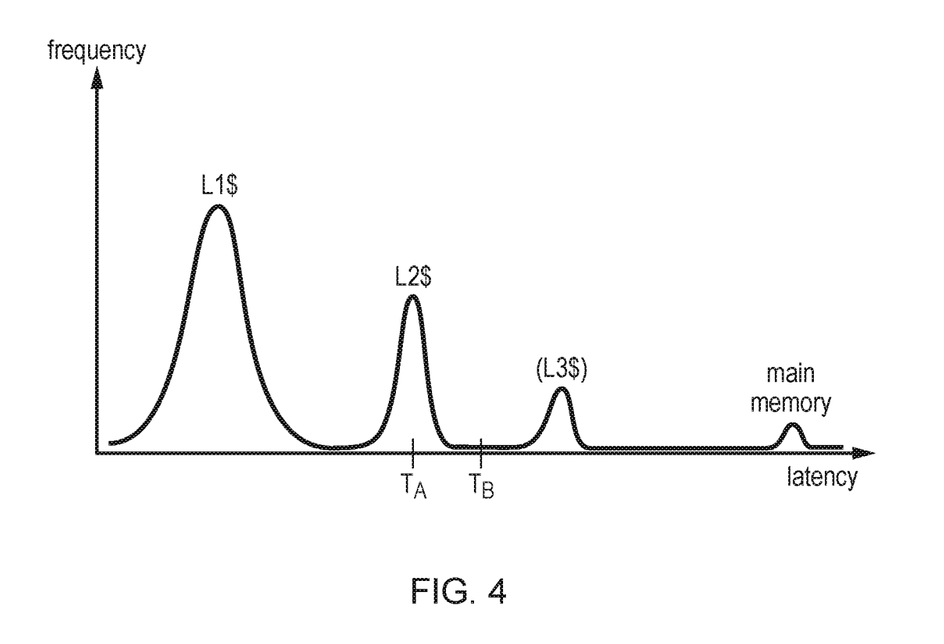
FIG. 4 is a graph showing the relative frequency with which data access requests experience different values of access latency.

This approach makes use of the observation that transaction latencies tend to fall into discrete groups which are clustered around the average latencies to hit in different levels of the cache 30, 32 or TLB 36, 38. FIG. 4 illustrates the relative frequency at which transactions tend to experience different access latencies. As shown in FIG. 4, in general most transactions will hit in the level 1 cache 30 and if so then the latency is relatively short. For transactions which miss in the level 1 cache, there is a greater delay which is clustered around a longer latency value when the transaction hits in the level 2 cache. The frequency with which instructions hit in the level 2 cache is less than the frequency for the level 1 cache. Similarly, if a level 3 cache is provided then again the latency will be longer and the frequency of instructions experiencing these latencies will be lower. For an instruction which requires an access to main memory there is a much greater latency and an even lower frequency. As shown in FIG. 4, the overall latencies tend to cluster around particular levels corresponding to the different levels of the cache hierarchy and in between there are latencies which do not occur for a significant number of instructions. A similar pattern may be experienced by address translation requests issued to the TLB. There will be some variation around the latencies associated with groups of transactions hitting a given level of the cache or TLB, due to factors such as contention and asynchronous bridges, but usually there will be a large gap between each group and a very large gap between the last level of cache and TLB and accesses to external memory.

Hence, if the flush event has been triggered but the comparison 90 has detected that the difference between the eventual return delay $t_i$ at the point when the information is returned and the threshold T is smaller than the "small" limit, then this indicates that the threshold has been set to a level (e.g. level $T_A$ shown in FIG. 4) which corresponds to one of the peaks in the frequency chart. Since the transaction actually completed soon after the flush was triggered, then it is likely that the threshold is too low and so by increasing the threshold for a subsequent comparison, gradually the threshold can be moved into one of the gaps between the 'peaks' associated with different levels of the cache or TLB hierarchy to provide a more reliable estimate of when the delay will continue long after the threshold is exceeded.

On the other hand, if the comparator 90 determines that that difference between the timer 82 and the threshold T at the point of completion of a transaction is relatively large then this may indicate that the threshold is currently set to a level which lies in the gap between the frequency peaks corresponding to different levels of the cache or TLB hierarchy (e.g. see $T_B$ in FIG. 4), and so by decrementing the threshold this can push the threshold closer to the foot of the peak associated with the previous level of cache or TLB so that a flush will be considered earlier next time so that the other threads can make greater use of the period of waiting for this stall to be resolved on the flushed thread.

This approach allows this system to cope with variation in latency between different system topologies or variation of the latency from time to time due to contention and other changes in operating conditions, so that the same predictor circuitry 52 can be provided in a range of different system architectures, and it is not necessary to have knowledge about the particular system topology to set a threshold which allows efficient control of the flush timing.

In some examples, the comparator 90 may trigger decrementing of the flush threshold T each time $t_i$-T is greater than the big limit, and may trigger an increment every time the difference $t_i$-T is smaller than the small limit. However, in some cases this may cause oscillations of the threshold value where the threshold value is repeatedly incremented and decremented, especially when the threshold T is already close to the preferred value for a given system. To avoid excessive oscillations on the threshold value, optionally a confidence mechanism 96 may be provided to gate the occasions on which the flush threshold T is incremented or decremented. The confidence mechanism 96 may include a pair of saturating confidence counters including an increment confidence counter ($C_{INC}$) 97 and decrement confidence counter ($C_{DEC}$) 98. Two AND gates 99, 100 are provided for triggering an increment or decrement of the flush threshold T depending on the output of the corresponding confidence counter 97, 98 and the increment or decrement signals 94, 92 output by the comparator 90. The confidence mechanism 96 operates as follows.

When a useful flush is detected (i.e. $t_i$-T is big and the decrement signal 92 is asserted) then increment confidence counter 97 is incremented, and the decrement confidence counter 98 is decremented. When a flush which was not useful is detected (i.e. $t_i$-T was small) then the increment signal 94 is asserted and this causes the increment confidence counter 97 to be decremented.

The value of the increment confidence counter 97 is compared with 0 and the signal 101 input to AND gate 99 is high if the increment confidence counter 97 equals 0. The AND gate 99 receives signal 101 and the increment signal 94 and outputs a signal to trigger incrementing of the flush threshold T only if both signals 94, 101 are high. Hence, the occasional time when the transaction completed soon after the flush will not cause the flush threshold to be incremented, if there have also been times when there was a large delay following the flush, but if there have been enough occasions when the transaction completed soon after the flush then the increment confidence counter 97 will be reduced to 0 and this triggers incrementing of the flush threshold T to ensure that the flush happens later next time.

On the other hand, the comparator 90 also compares T-$t_i$ with the small limit for transactions where the transaction was completed before the timer 82 reached the flush threshold T. Hence, for transactions which almost triggered the flush, but it was good that the flush was not triggered, a signal 102 is asserted and this triggers the decrement confidence counter 98 to be incremented. A signal 103 is generated indicating whether the decrement confidence counter 98 is equal to 0, and the AND gate 100 triggers decrementing of the flushed threshold T only if both the decrement signal 92 and the signal 103 indicating whether the decrement confidence counter 98 is 0 are both high. This ensures that a rare event when a transaction was delayed for a long time following the threshold does not trigger the threshold to be decremented immediately, especially if there have recently been a number of occasions when the transaction completed shortly before the thresholds T was reached. However, if transactions repeatedly exceed the flushed threshold T by a large amount then this will bring the decrement confidence counter 98 to 0, the flush threshold T will be decremented to trigger a flush sooner the next time.

Hence, this method allows the flush threshold T to be dynamically adjusted to an appropriate level without excessive oscillations up and down. It will be appreciated that the confidence mechanism 96 is optional and some systems may not provide it. Also this is just one example of a possible confidence mechanism but in general any mechanism which requires a certain number of increment or decrement events triggered by signals 94, 92 to occur before the flush threshold T is actually incremented or decremented may be used.

It will be appreciated that the terms increment and decrement referred to above may simply refer to adjustments of the confidence counters 97, 98 or the flush threshold 86 by opposite amounts. In the example of FIG. 3 an increment corresponds to the adding 1 to the counter or the threshold and the decrement corresponds to the subtracting 1, but in other cases the terms increment and decrement may be mapped the opposite way round so that an increment is negative and the decrement is positive. Also, the amount by which the threshold or the confidence counters are increment could differ from 1. For example the flush thresholds T could be adjusted in increments or decrements of a predetermined value which may be greater than 1, to speed up adjustments to the threshold. Also, in some cases the increment amount could be different from the decrement amount.

The confidence counters 97, 98 may saturate at a given number of increments. For example, each counter may have a certain number of bits and so once the counter reaches a value where all the bits are 1 then further increments would not change the count value. Some embodiments may have increment and decrement counters 97, 98 with equal numbers of bits. However, it can be useful to provide the decrement counter 98 with a greater number of bits than the increment counter 97, so that the increment confidence counter will saturate sooner than the decrement confidence counter. This means fewer increment events triggered by signal 94 may cause an increment to the flush threshold T than the number of decrement events indicated by signal 92 required to trigger decrementing of the threshold. The asymmetry in the confidence counters can be useful because it is usually safer to increase the flush threshold T than to decrease it, because there is a power and performance cost associated with unnecessarily flushing instructions and only a potential performance gain from flushing, and so by making the decrement counter 98 larger than the increment counter 97 this can increase the likelihood that the threshold T is only decreased when there are a significant number of events indicating that the predictor is currently waiting too long before flushing.

Figure 5:
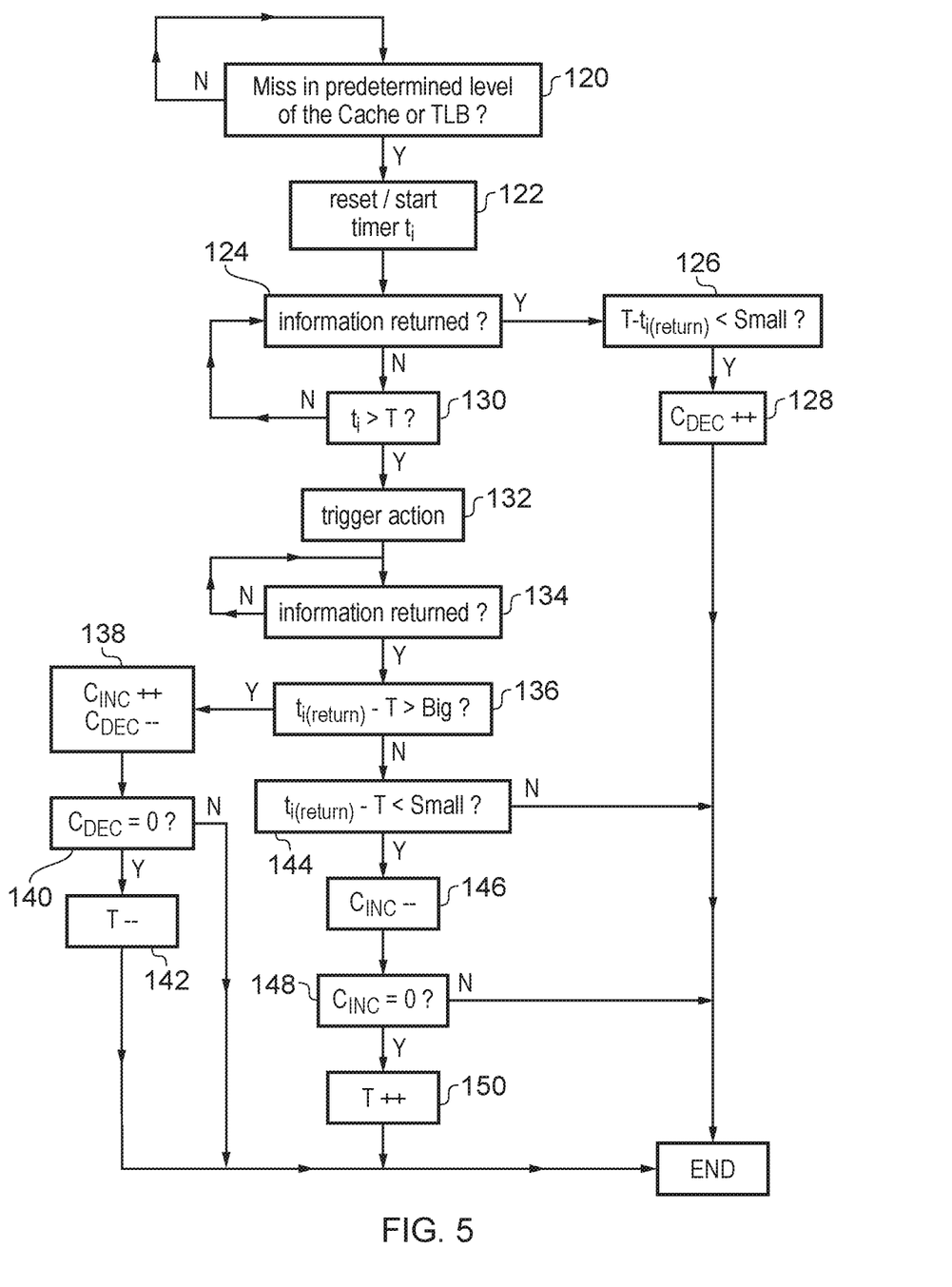
FIG. 5 illustrates a method of determining based on a delay in accessing information from storage circuitry whether to trigger a predetermined action.

FIG. 5 shows a method of detecting whether to trigger a predetermined action, such as the flush event mentioned above, depending on a comparison of the delay in handling a given transaction. At step 120 the predictor determines whether there has been a miss in the level 1 cache 30 or level 1 TLB 36. If not then the predictor continues to wait for a transaction to miss. When there is an L1 cache or a TLB miss then at step 122 the predictor 52 resets the timer 82 in a transaction slot 80 corresponding to the transaction which missed, and starts counting the time delay associated with fetching the required data or address translation entry from a further level of cache or TLB or memory. At step 124 the predictor 52 determines whether the required information has been returned. If so, then at step 126 the predictor 52 determines whether $T-t_i$ at the point when the information was returned is less than the small limit. That is, step 126 determines whether the information was returned relatively shortly before the threshold delay would have been reached. If so, then at step 128 the predictor increments the decrement confidence counter 98. The method then ends for this particular transaction. On the other hand, if the information has not been returned yet then at step 130 the predictor 52 determines whether the delay measured by timer 82 exceeds the flush threshold T. If not, then the method returns to step 124 and continues looping through steps 124 and 130 until either the information is returned or the timer exceeds the flush threshold T.

If the timer $t_i$ exceeds the flush threshold, then at step 132 a predetermined action is triggered. For example, the predetermined action may be flushing of the instructions from a given thread and increasing the fraction of fetched instructions fetched from other threads as discussed above, but it could also be other kinds of events such as placing a portion of the pipeline in a power saving state while information from the storage circuitry is being returned or updating some profiling information tracking performance of the pipeline.

Having triggered the action, the predictor 52 continues to monitor whether the information required is returned at step 134. Eventually, once the information has been returned then at step 136 the predictor determines whether $t_i-T$ (the difference between the timer 82 and the threshold T at the points of returning the information) is larger than the big limit. If so then at step 138 the increment confidence counter 97 is incremented and the decrement confidence counter 98 is decremented. At step 140 the predictor determines whether the decrement confidence counter is now equal to 0. If so, then at step 142 the flush threshold 96 is decremented, while if the confidence counter 98 is not 0 then the method ends without updating the flush threshold T.

On the other hand, if the predictor determines at step 144 that the difference $t_i-T$ is less than small limit (i.e. the transaction completed soon after the predetermined action was triggered), then at step 146 the predictor 52 decrements the increment confidence counter 97, and at step 148 determines whether the increment confidence counter 97 is now 0. If the increment confidence counter 97 is 0 then at step 150 the flush threshold T is incremented so that the flush will occur later next time. The method then ends. Step 150 is skipped if the increment confidence counter 97 is not 0 at step 148.

While FIG. 5 shows an example where both steps 126 and 144 compare against the same value of the small limit, in other examples these could use different limits for comparing the difference between the flush threshold T and the return time delay $t_i$ in the cases when the flush was and was not triggered.

FIGS. 3 to 5 show a particular mechanism for detecting when to flush the pipeline, and adaptively modifying the threshold for detecting the stall event based on how much the data access delay exceeded, or was less than, the threshold at the point when the data was eventually returned. However, the same mechanism could be used for predicting other kinds of events, not just triggering a flush of a pipeline. In general, for any predetermined action which is to be triggered when a delay in accessing information from the storage circuitry becomes greater than a delay threshold, threshold updating circuitry may be provided to determine a return delay at the point when the information is returned from the storage circuitry and to adjust the delay threshold based on the difference between the return delay and the delay threshold. This can allow a given event dependent on access delays to be triggered with a variable time threshold depending on the current system conditions or topology, so that it is not necessary to set in advance a given time threshold which would required knowledge of the particular system conditions or architecture.

The delay may start to be counted when there is an access request for information which misses in a predetermined storage level of the storage circuitry. For example in FIG. 5 the predetermined level is the level 1 data cache or TLB, but it could also be a subsequent level of cache or TLB. By starting the counting only when there is a miss in a given level of the cache/TLB hierarchy, this avoids the energy overhead of toggling a timer for all requests when many of those requests in any case may be satisfied by the top level cache or TLB.

The predetermined action which is triggered when the delay in accessing the data exceeds the threshold may vary. In some cases it may simply be an estimation of whether an access request missed in a given storage level of the storage circuitry. In other cases, the action may comprise flushing instructions of a given thread from a pipeline and reducing a fraction of fetched instruction fetched from the given thread as in the examples above. The action taken could also be placing a portion of the processing circuitry in a power saving state while awaiting the information from the storage circuitry. For example, even in a pipeline which only processes instructions from a single thread, the prediction mechanism above can be useful because if the single thread being processed encounters a stall while waiting for information to be fetched from a data store, then this may delay many of the instructions in the thread and so it may be efficient to power down some portions of the pipeline until the information is returned. Another example of the predetermined action could be updating profiling information such as a program profile or trace information based on the performance monitored for the data access.

In general the threshold updating circuitry may increase the delay threshold in response to the difference between the return delay and the delay threshold being smaller than a first amount for at least one access request for information from the data store. Hence, if the data was returned soon after the action was triggered then the delay threshold may be increased to make it less likely that the action will be triggered next time. This approach makes it more likely that the overhead of the predetermined action can be restricted to cases where there is more likely to be a significant delay beyond the threshold being exceeded. Conversely the delay threshold can be reduced when the difference between the return delay and the delay threshold is greater than the second amount for at least one access request. Hence, if there is a very long delay after the threshold was exceeded then the threshold can be reduced so that it is more likely that the predetermined action will be triggered even earlier next time.

As mentioned above at least one confidence counter may be provided and the threshold updating circuitry may increment or decrement the confidence value based on the difference between the return delay and the delay threshold and then determine whether the update the delay threshold based on the confidence value. This can reduce oscillations in the threshold value so that a certain number of qualifying events are required before the threshold is adjusted.

More particularly, this threshold updating circuitry may update the threshold as follows. The threshold updating circuitry may comprise a first confidence counter to store a first confidence value, and a second confidence counter to store a second confidence value. When $t_i-T$ is smaller than a first amount (where $t_i$ is the return delay and T is the delay threshold) the threshold updating circuitry may adjust the first confidence value to move towards a first predetermined value, and increase the delay threshold when the adjustment to the first confidence value causes the first confidence value to reach said first predetermined value. When $t_i-T$ is greater than a second amount, the threshold updating circuitry may adjust the first confidence value to move away from the first predetermined value, adjust the second confidence value to move towards a second predetermined value, and reduce the delay threshold when the adjustment to the second confidence value causes the second confidence value to reach said second predetermined value. When $T-t_i$ is smaller than a third amount, the threshold updating circuitry may adjust the second confidence counter to move away from the second predetermined value.

In some cases the first and second confidence counters may comprise saturating counters and the second confidence counter may comprise a greater number of bits than the first confidence counter. It can often be safer to increase the threshold than to decrease it because decreasing the threshold may result in the power and performance costs associated with triggering the given action being incurred too early when there is only a potential performance gain from carrying out the action. By providing asymmetric counters this may make it easier to increase the threshold than decrease it.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An apparatus comprising:
control circuitry to trigger a predetermined action when a delay in accessing information from storage circuitry becomes greater than a delay threshold;
threshold updating circuitry to determine a return delay when the information is returned from the storage circuitry and to adjust the delay threshold in dependence on a difference between the return delay and the delay threshold; and
a first confidence counter to store a first confidence value, and a second confidence counter to store a second confidence value, wherein:
when $t_i-T$ is smaller than a first amount, where $t_i$ is the return delay and T is the delay threshold, the threshold updating circuitry is configured to adjust the first confidence value to move towards a first predetermined value, and to increase the delay threshold when the adjustment to the first confidence value causes the first confidence value to reach said first predetermined value;
when $t_i-T$ is greater than a second amount, the threshold updating circuitry is configured to adjust the first confidence value to move away from the first predetermined value, to adjust the second confidence value to move towards a second predetermined value, and to reduce the delay threshold when the adjustment to the second confidence value causes the second confidence value to reach said second predetermined value; and
when $T-t_i$ is smaller than a third amount, the threshold updating circuitry is configured to adjust the second confidence counter to move away from the second predetermined value.

2. The apparatus according to claim 1, wherein the storage circuitry comprises a plurality of storage levels.

3. The apparatus according to claim 2, wherein the control circuitry is configured to start counting the delay in accessing information from the storage circuitry in response to an access request for information from said storage circuitry missing in a predetermined storage level of the storage circuitry.

4. The apparatus according to claim 2, wherein the predetermined action comprises estimating whether an access request missed in a given storage level of the storage circuitry based on whether the delay is greater than the delay threshold.

5. The apparatus according to claim 1, comprising a processing pipeline to process fetched instructions from a plurality of threads;
wherein the predetermined action comprises flushing from the processing pipeline at least one instruction from a given thread which requested the information from the storage circuitry and reducing a fraction of the fetched instructions which are fetched from said given thread.

6. The apparatus according to claim 1, wherein the predetermined action comprises placing at least a portion of processing circuitry in a power saving state while awaiting the information from the storage circuitry.

7. The apparatus according to claim 1, wherein the predetermined action comprises updating profiling information.

8. The apparatus according to claim 1, wherein the threshold updating circuitry is configured to increase the delay threshold in response to the difference between the return delay and the delay threshold being smaller than a first amount for at least one access request for information from the data store.

9. The apparatus according to claim 1, wherein the threshold updating circuitry is configured to reduce the delay threshold in response to the difference between the return delay and the delay threshold being greater than a second amount for at least one access request for information from the data store.

10. The apparatus according to claim 1, comprising at least one confidence counter to store at least one confidence value;
wherein the threshold updating circuitry is configured to increment or decrement said at least one confidence value in dependence on the difference between the return delay and the delay threshold, and to determine whether to update said delay threshold based on said at least one confidence value.

11. The apparatus according to claim 1, wherein the third amount equals the second amount.

12. The apparatus according to claim 1, wherein the first confidence counter and the second confidence counter comprise saturating counters, and the second confidence counter comprises a greater number of bits than the first confidence counter.

13. A data processing method comprising:
triggering a predetermined action when a delay in accessing information from storage circuitry becomes greater than a delay threshold;
determining a return delay when the information is returned from the storage circuitry;
adjusting the delay threshold in dependence on a difference between the return delay and the delay threshold;
when $t_i-T$ is smaller than a first amount, where $t_i$ is the return delay and T is the delay threshold, adjusting a first confidence value to move towards a first predetermined value, and increasing the delay threshold when the adjustment to the first confidence value causes the first confidence value to reach said first predetermined value;
when $t_i-T$ is greater than a second amount, adjusting the first confidence value to move away from the first predetermined value, adjusting a second confidence value to move towards a second predetermined value, and reducing the delay threshold when the adjustment to the second confidence value causes the second confidence value to reach said second predetermined value; and
when $T-t_i$ is smaller than a third amount, adjusting the second confidence counter to move away from the second predetermined value.

* * * * *